United States Patent [19]

Moore

[11] 4,320,853
[45] Mar. 23, 1982

[54] CAP ASSEMBLY FOR A FUEL TANK IN A MOTOR VEHICLE

[75] Inventor: Donald E. Moore, Plymouth, Mich.

[73] Assignee: Ford Motor Company, Dearborn, Mich.

[21] Appl. No.: 190,692

[22] Filed: Sep. 25, 1980

[51] Int. Cl.³ .............................................. B65D 55/16
[52] U.S. Cl. ............................. 220/375; 220/DIG. 33
[58] Field of Search ............... 220/375, DIG. 33, 339; 215/206; 222/543

[56] References Cited

U.S. PATENT DOCUMENTS

| | | | |
|---|---|---|---|
| 2,971,045 | 2/1961 | August | 220/339 X |
| 3,199,751 | 8/1965 | Jovanovich | 222/543 |
| 4,004,614 | 1/1977 | Mackal et al. | 220/375 X |
| 4,228,915 | 10/1980 | Hooper et al. | 220/DIG. 33 |

Primary Examiner—George T. Hall
Attorney, Agent, or Firm—Steven L. Permut; Clifford L. Sadler

[57] ABSTRACT

A fuel cap assembly 10 includes a fuel cap 14 rotatably mounted on one end 28 of a tether 16 which has a second end 36 rigidly secured to a motor vehicle 12. The tether 16 is sufficiently stiff to suspend the gas cap away from the vehicle panel 26 when the cap is disengaged from the spout 18.

9 Claims, 5 Drawing Figures

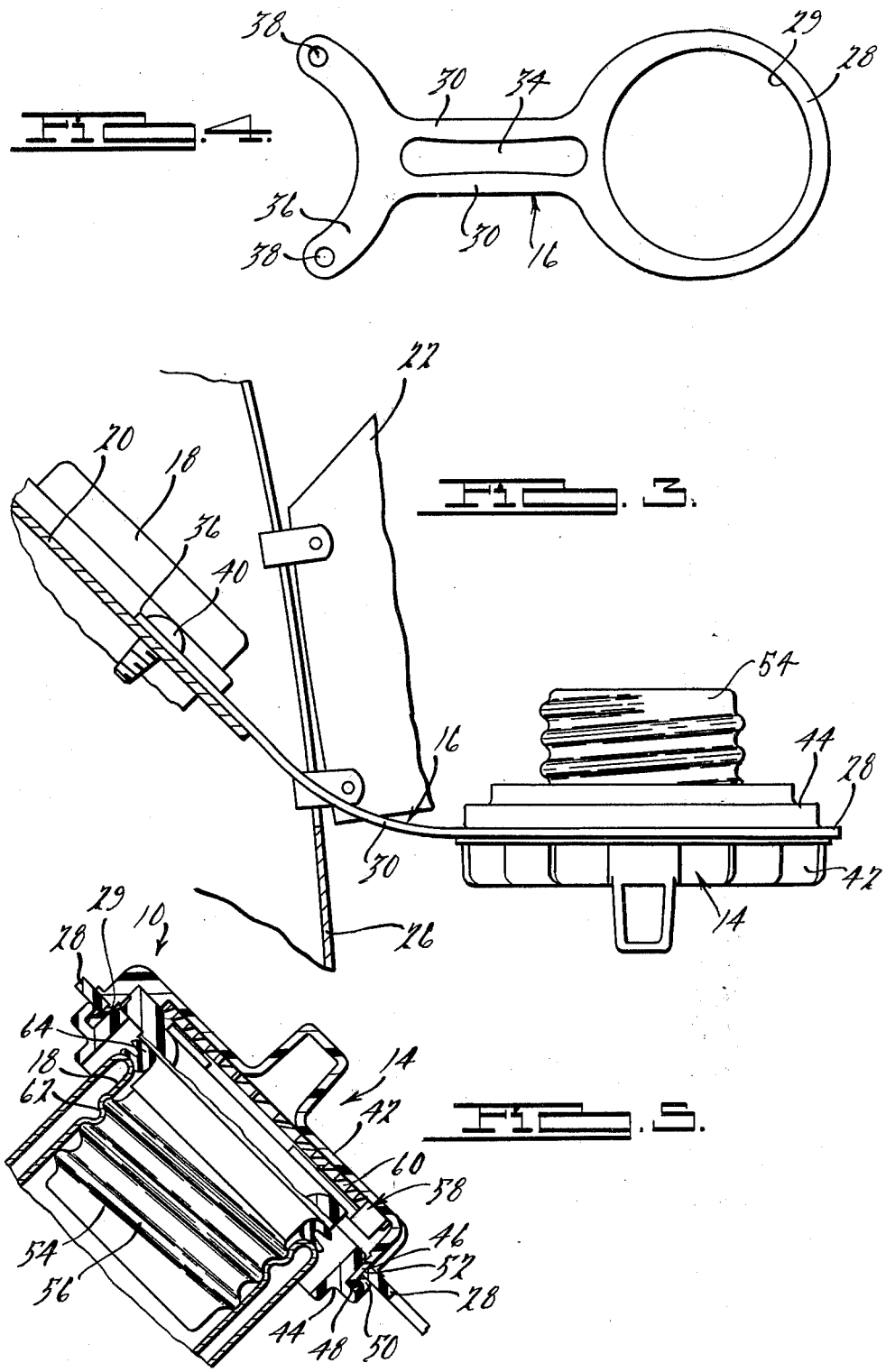

CAP ASSEMBLY FOR A FUEL TANK IN A MOTOR VEHICLE

BACKGROUND OF THE INVENTION

1. Field of the Invention

This invention relates to fuel cap assemblies and more particularly to tethered fuel caps for motor vehicles and the like.

2. Disclosure Information

Almost all motor vehicles have a fuel tank which can be filled with liquid fuel like gasoline or diesel fuel. The fuel is most commonly supplied to the tank through a filler spout which is closed off by a fuel cap.

The fuel cap is disengageable from the filler spout and most commonly has no tether to secure it to the motor vehicle. As a consequence, the fuel cap can be inadvertently left behind and lost after filling the fuel tank.

Past attempts to tether the fuel cap to the motor vehicle have not been particularly successful. The major problem is that the tether in the past, most commonly a chain, allows the fuel cap to drop uncontrollably until the tether is fully extended. This uncontrollable drop often allows the fuel cap to bang against the side of the vehicle which can result in scratching or nicking the painted surface of the vehicle.

In some cases, the tether itself, made from metal chain, nicks or scratches the exterior surface of the motor vehicle. In addition, if the motor vehicle travelled with the fuel cap disengaged, the fuel cap and chain tether would violently bang against the exterior surface intensively denting, marring, or scratching it. The repeated hitting of the fuel cap and tether against the motor vehicle would after a short period of time create a marred area on the exterior of the vehicle which can also cause rust problems if the metal surface becomes exposed through the paint. As a consequence, tethered gas caps have never been popular for motor vehicles.

The recent rise in popularity of self-service gasoline stations has accentuated the problem of motorists forgetting the caps at the station or improperly putting them on so they can disengage from the filler pipe spout and fall off. A tethered gas cap is needed which does not mar the exterior appearance of the vehicle through normal usage but still allows the fuel cap to become sufficiently separated from the filler pipe spout so as to not obstruct it from the introduction of a fuel pump nozzle.

SUMMARY OF THE DISCLOSURE

In accordance with the invention, a fuel cap assembly for a fuel tank in a motor vehicle includes a fuel cap engageable to a filler spout. The fuel cap is rotatably mounted to one end of a plastic tether which has a second end rigidly connected to the motor vehicle adjacent the filler spout. The tether has a middle strap portion integral with the two end portions which is substantially folded when the fuel cap engages the filler spout. The strap portion unfolds when the fuel cap disengages from the filler spout. The plastic tether is sufficiently rigid to extend horizontally and counter the force of gravity exerted on the fuel cap when it is in the disengaged position thereby allowing the cap to be suspended in air away from the motor vehicle.

In one embodiment, the first end of the tether is annular in shape and has an internal diameter forming an aperture sized to engage a cylindrical groove formed in the fuel cap.

The broader aspect of the invention includes a tether having a first end connected to the fuel cap and a second end secured to the motor vehicle. The tether is flexurally stiff enough to counter the force of gravity exerted on the fuel cap when the tether is extended in a substantially horizontal position.

BRIEF DESCRIPTION OF THE DRAWINGS

Reference now will be made to the following drawings in which:

FIG. 3 is side elevational view of the fuel cap assembly showing the cap in the disengaged position.

FIG. 4 is a plan view of the tether shown in FIG. 1.

FIG. 5 is a partially segmented view of the gas cap and tether assembly engaged to the filler spout taken along the lines V—V in FIG. 1.

DETAILED DESCRIPTION OF THE PREFERRED EMBODIMENT

Figure 1:
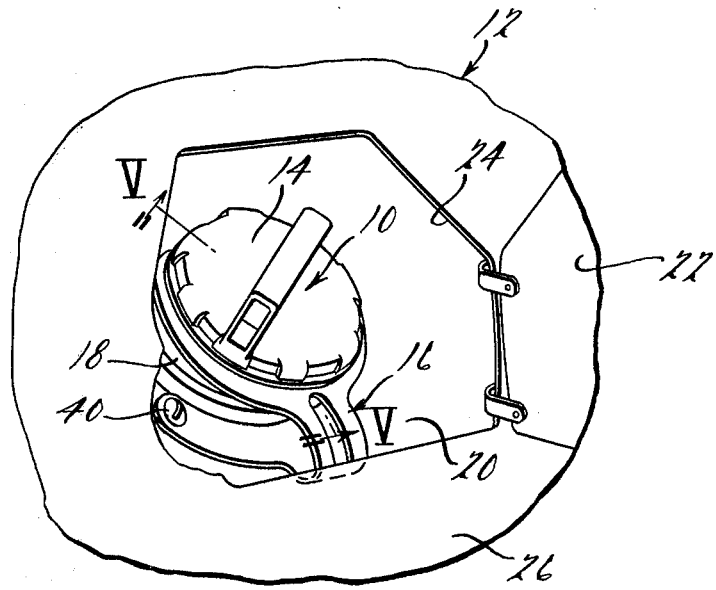
FIG. 1 is a perspective view of one embodiment of the invention showing a fuel cap engaged to a filler spout.

Referring to FIG. 1, a fuel cap assembly 10 for a motor vehicle, indicated as 12, includes a fuel cap 14 rotatably mounted to a tether 16 which is secured to the motor vehicle 12. The fuel cap 14 is threadably engageable to a filler spout 18 which extends through a body panel 20. The panel 20 and cap 14 are exposed to the exterior of the motor vehicle through aperture 24 in an exterior panel 26 of the motor vehicle. A hinged door 22 can be mounted to cover aperture 24 and conceal the cap assembly 10 and panel 20.

Figure 2:
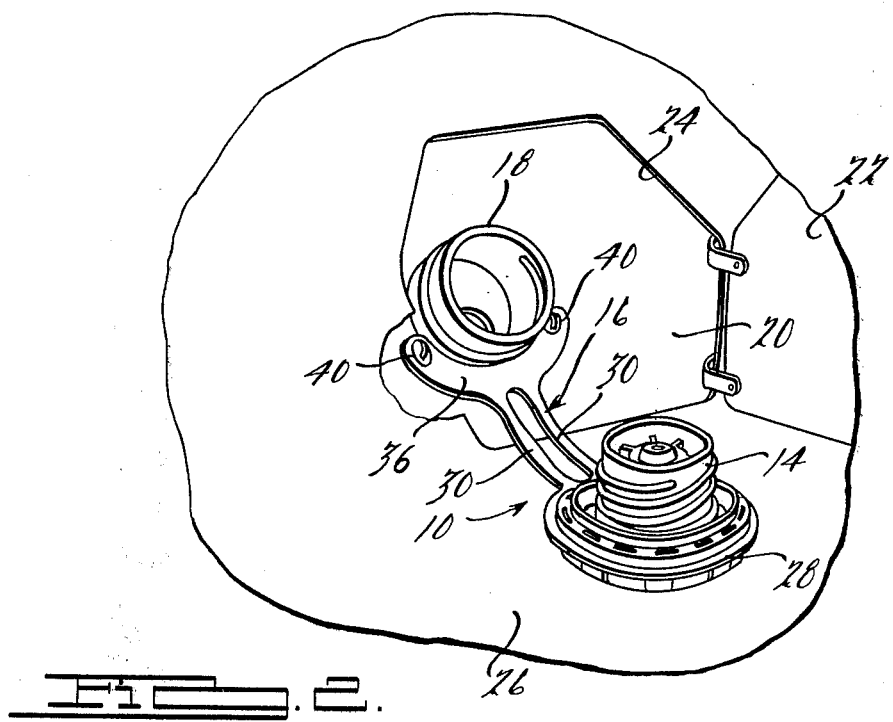
FIG. 2 is a perspective view similar to FIG. 1 showing the fuel cap disengaged from the filler spout.

The tether 16 is an integrally formed single piece of a high density polyethylene with 0.25 to 0.50 percent carbon black added for ultraviolet protection. Other flexible plastic materials can be used. The tether, as shown in FIG. 4, has an annular end 28 and an arcuate end 36 connected together by two straps 30. The annular end 28 has an aperture 29 therethrough. The two straps 30 are spaced apart forming an elongated slot 34 therebetween. The straps are approximately 2 inches long and range from slightly under ¼ inch width to slightly over ¼ inch in width. The arcuate end 36 has two bolt holes 38 therein which receive bolts 40 which secure the arcuate end 36 to the panel 20 just below the filler spout 18 as shown in FIG. 2. As more clearly shown in FIG. 3, the tether has a uniform thickness which is desirably in the range of 0.08 to 0.10 inches (2.0–2.3 mm).

The annular end 28 is secured to the fuel cap 14 between a cover member 42 and a retainer ring 44. Referring now to FIG. 5, the end 28 has aperture 29 sized to fit about a cylindrical skirt portion 46 of cover member 42. The bottom of the skirt portion has an outwardly extending circular flange 48. The outer diameter of the flange may be slightly larger than the aperture 29 so long as the annular end 28 of tether 16 can flex about the flange 46 to fit onto the skirt 46. The cover member 42 has an outer diameter substantially larger than the diameter of aperture 29.

The retainer ring 44 has a plurality of inwardly extending flanges 50 which snap over the circular flange 48 to be secured to cover member 42. The outer diameter of the retainer ring 44 is substantially larger than the diameter of aperture 29. The retainer ring 44 is spaced from the outer diameter section of the cover member 42 to form a groove 52 in which the annular end 28 of tether 16 is received. In this fashion, the cap 14 is rotatably mounted to the tether 16.

The cap 14 itself is a lightweight plastic assembly which incorporates the plastic cover member 42, plastic retainer ring 44 and a plastic latching assembly 54 which has an external thread 56. The plastic latching assembly includes a pawl 58 which engages ratchet wheel 60 integral with the cover member 42. The ratchet wheel and pawl prevent the overtightening of the cap onto the internal thread 62 of the spout 18 while providing a rigid assembly when the cover is rotated to disengage from spout 18. The cap also includes an annular seal 64 which seals the top end of the spout 18. The plastic cap 14 weighs approximately 0.19 lbs. Other cap structures can be utilized with the tether; for example caps incorporating engaging prongs, locking projections or other retainer tabs in conjunction with a compatible filler spout opening.

In operation, when the cap is engaged at the filler spout 18 as shown in FIG. 1, the tether straps 30 are substantially folded over such that door 22 can be closed to cover aperture 24. The cap 14 can be rotated and disengaged from the filler spout 18. The rotatable connected between the cap 14 and tether 16 assures the tether 16 does not become harmfully twisted. As the cap is disengaged from spout 18, the straps 30 flex to unfold and extend which allows the cap to be pulled away from the spout 18 and the spout to be unobstructed. When the cap is in the disengaged position, as shown in FIG. 2, the tether by being secured to the motor vehicle below the spout 18 allows the force of gravity to exert its force on the fuel cap away from the spout 18 such that the cap will not obstruct the spout opening. However, the straps 30 are flexurally stiff enough to suspend the cap 14 in mid air against the force of gravity maintaining a space between the cap 14 and the exterior panel 26 of the motor vehicle as shown in FIG. 3.

In normal usage, the tether 18 has a sufficient stiffness such that the cap will never hit the exterior surface 26 and marr its appearance or finish. The cap, instead of falling vertically downward to a hanging position as it would with a chain tether and possibly banging against the panel 26 during its fall, is maintained in a suspended position away from the panel 26.

Even if the motor vehicle is inadvertently driven with the fuel cap disengaged from the spout 18, the tether is sufficiently stiff enough to maintain a horizontal direction and maintain the space between the cap and the panel 26 in spite of most shocks and vibrations incurred during the inadvertent drive.

If a sufficient jolt is incurred during driving of the motor vehicle when the cap is disengaged from spout or an operator overly manhandles the cap such that the cap does touch the panel 26, the relatively softer plastic material of the cap 42 minimizes any scratching or denting of the panel 26.

In spite of the sufficient rigidity of the tether to prevent the cap from banging against the panel 26, the tether easily flexes under the force exerted by an operator to allow disengagement and engagement of the cap 14 with respect to the spout 18.

Variations and modifications of the present invention are possible without departing from its spirit and scope as defined by the appended claims.

The embodiments of the invention in which such exclusive property or privilege is claimed are defined as follows:

1. A fuel cap assembly for a motor vehicle comprising:
   a fuel cap constructed to sealingly engage a filler spout;
   a tether connectable at a first end thereof to the fuel cap and at a second end thereof to the motor vehicle;
   said tether being flexurally stiff enough to counter the force of gravity exerted on said fuel cap to maintain said cap in a suspended position away from said motor vehicle when disengaged from said filler spout.

2. A fuel cap assembly as defined in claim 1 wherein:
   said second end is rigidly secureable to said motor vehicle;
   said first end is rotatably connected to said fuel cap.

3. A fuel cap assembly as defined in claim 2 wherein the first end is rigidly secured to said motor vehicle adjacent said filler spout.

4. A fuel cap assembly as defined in claim 3 wherein a middle portion of said tether includes a strap which is connected to the first end of the tether at a point below the filler spout such that when the cap is disengaged from the spout, the force of gravity forces the cap in a direction away from the spout.

5. A fuel cap assembly as defined in claim 4 wherein the middle portion of said tether includes a strap which is substantially folded over when the cap engages the spout and unbends towards an extended position when the cap is disengaged from the filler spout.

6. A fuel cap assembly as defined in claim 1 wherein said tether includes a middle portion comprising two substantially parallel straps with a space formed therebetween.

7. A fuel cap assembly as defined in claim 1 wherein said tether comprises a plastic material having a thickness ranging from approximately 0.06 to 0.12 inches.

8. A fuel cap assembly as defined in claim 1 wherein:
   said fuel cap includes:
      a cover member with a depending skirt of smaller diameter than the outer diameter of said cover member;
      said skirt having a radially outward extending flange;
      a retainer ring which engages said flange of said skirt and having an outer diameter greater than the diameter of the skirt;
      said retainer ring and said handle forming a cylindrical groove therebetween adjacent said skirt;
      said first end of said tether having an aperture therethrough having a diameter larger than said skirt to rotatably receive said skirt therethrough and smaller than the outer diameters of said retainer ring and said cover member to be rotatably secured to said cap in said groove.

9. A gas cap assembly as defined in claim 8 wherein said fuel cap cover member is made from a plastic material.

* * * * *